United States Patent [19]

Boring et al.

[11] Patent Number: 4,728,476
[45] Date of Patent: Mar. 1, 1988

[54] METHOD OF SUPPLYING A MOLDABLE MIXTURE OF MATERIALS TO AN ARTICLE FORMING MOLD OF AN INJECTION MOLDING MACHINE

[75] Inventors: Douglas J. Boring; Richard V. Reib, both of Franklin, Pa.

[73] Assignee: Resin Stretchers, Reno, Pa.

[21] Appl. No.: 791,505

[22] Filed: Oct. 25, 1985

Related U.S. Application Data

[63] Continuation-in-part of Ser. No. 659,518, Oct. 12, 1984, abandoned, which is a continuation of Ser. No. 455,110, Jan. 3, 1983, abandoned.

[51] Int. Cl.⁴ .................. B29C 45/74; B29C 45/78
[52] U.S. Cl. .................. 264/328.18; 264/40.6; 264/328.9; 425/144; 425/586
[58] Field of Search ............ 264/40.6, 328.1, 328.18, 264/328.19; 425/144, 580, 582, 585, 586

[56] References Cited

U.S. PATENT DOCUMENTS

| | | | |
|---|---|---|---|
| 2,309,729 | 2/1943 | Gordon | 264/328.19 |
| 3,728,053 | 4/1973 | Stillhard et al. | 264/328.6 |
| 3,732,345 | 5/1973 | Amos et al. | 264/328.18 |
| 3,959,433 | 5/1976 | Sauers | 264/328.6 |
| 4,165,302 | 8/1979 | Armenti et al. | 524/456 |
| 4,311,446 | 1/1982 | Hold et al. | 425/144 |

FOREIGN PATENT DOCUMENTS

| | | | |
|---|---|---|---|
| 2550870 | 11/1975 | Fed. Rep. of Germany. | |
| 2801789 | 7/1979 | Fed. Rep. of Germany. | |
| 981611 | 1/1965 | United Kingdom | 425/144 |

Primary Examiner—Jeffery Thurlow

[57] ABSTRACT

A method of supplying material to an article forming mold of an injection molding machine. The method comprises initially mixing a granular thermoplastic resin with a granular filler in a dry state and then heating the dry mixture in the chamber in which the feed screw of an injection molding machine rotates. The heating is controlled to initially convert the dry resin to a molten mass while simultaneously heating the filler with the filler remaining as a heated solid. After such initial heating the molten resin/heated filler is retained at a lower temperature prior to molding and then is further heated for ejection from the chamber.

9 Claims, 2 Drawing Figures

METHOD OF SUPPLYING A MOLDABLE MIXTURE OF MATERIALS TO AN ARTICLE FORMING MOLD OF AN INJECTION MOLDING MACHINE

This application is a continuation-in-part of Ser. No. 06/659,518 filed Oct. 12, 1984 abandoned which is a continuation of Ser. No. 06/455,110 filed Jan. 3, 1983 now abandoned.

BACKGROUND

In the molding of plastic articles by injection molding machines, there is the constant problem of obtaining molded products at the lowest practical cost consistent with the quality of product desired. Obviously, the lower processing cost per item permits plastic molders to become more competitive and permits the use of molded plastic articles in an increasing number of products.

In producing plastic articles, resins are the basic ingredient used and represent the initial cost for a molded article. In order to reduce the resin cost, an entire industry has developed in supplying compounds of materials in which lower cost additives are mixed with a resin. Various compounding materials are used with resins to provide an effective way of tailoring moldable materials to obtain specific cost/performance needs for a molded article. The suppliers of such molding compounds are generally referred to as compounders and various processes for compounding resins and additives are well known to obtain the various commercial molding compounds. Although variations in compounding processes are known, compounding basically involves the introduction of a selected amount of a resin and one or more additives into a mixer to thereafter produce a homogeneous mixture of the resin and additive or additives. The homogeneous mixture is then supplied to a compounding extruder in which the mixture is heated to produce a plastic mass which heated mass is subsequently forced under high pressure through a die to produce continuous strands of compounded material. As the strands are discharged through the die, they enter a cooler, normally a water bath cooler, and are cooled to provide a solidified compounded plastic material. Thereafter the compounded material enters a pelletizer to produce pellets of a size as are desired by injection molders. The pellets are normally sized by being passed through a sizing screen and thereafter the sized pellets are mixed to obtain as homogeneous a mixture of pellets as is reasonable. When the pellets are received for processing by a molder they are first stored and, as desired, transported or conveyed to a material supply system of an injection molding machine. Frequently, due to variations in atmospheric conditions during the transportation and storage of the pellets, it is necessary to dry the pellets prior to their being conveyed to the material supply system so that the pellets have a sufficiently low moisture content to permit their subsequent use in an injection molding machine. The material supply systems frequently have auxiliary equipment for introducing still other additives to the pellets which are thoroughly mixed together prior to the entire mixture being discharged into the feed hopper of an injection molding machine. The entire mixture is fed from the feed hopper into the feed screw of an injection molding machine in a known manner and the entire mixture including the pellets are again heated into a molten plastic mass for subsequent forming into plastic articles. Obviously the cost of compounding and the handling of compounded pellets represent a substantial cost to a molder.

BRIEF DESCRIPTION

The present invention is to a method of supplying a mixture of a thermoplastic resin and a low heat conductivity additive to the article forming mold of an injection molding machine. In accordance with this invention it is necessary to heat the mixture in the feed screw of an injection molding machine, in an experimentally determined manner, to form a flowable mass which is suitable for producing a commercially acceptable molded article. Further the additive is of a material which does not liquefy during the period of heating of the mixture and during the molding process. Such low heat conductivity additives are one type of additive which are frequently referred to as fillers. Such low heat conductivity additives are frequently of a crystalline structure and are, in the vernacular, also referred to as "rock." Prior to heating the thermoplastic resin and low heat conductivity additive or filler are mechanically mixed together to form, to the extent practical, a uniform mixture of resin and filler. After mixing the mixture is then supplied to the feed screw of an injection molding machine which feed screw is of a finite length. It has been determined that it is necessary to initially rapidly heat the mixture in the initial length of the feed screw in which the mixture is received. Such heating of the supplied mixture converts the thermoplastic resin into a molten mass and heats the filler to essentially the same temperature as the molten resin; however, the filler is not converted into a molten mass or liquid. After such initial heating the heating of the molten resin/heated filler mixture is continued at a rate to maintain the heated mixture in a standby moldable condition. Prior to the injection of the molten resin/heated filler into an injection machine mold the molten resin/heated filler is again heated to a higher temperature than the intermediate standby temperature to insure that a plastic article is properly formed.

Accordingly, one object of this invention is to provide a new and improved method for supplying a mixture of a thermoplastic resin and a low heat conductivity additive to the article forming mold of an injection molding machine.

Another object of this invention is to provide a new and improved method for supplying a mixture of a thermoplastic resin and a low heat conductivity additive to the article forming mold of an injection molding machine in which the temperature of the mixture is controlled in longitudinal zones within the feed screw of an injection molding machine.

A more specific object of this invention is to provide a new and improved method for supplying a mixture of a thermoplastic resin and a low heat conductivity additive to the article forming mold of an injection molding machine in which the temperature of the mixture is controlled within the feed screw of an injection molding machine in at least three zones along the length of the feed screw.

These and other objects of this invention will be better understood in view of the following description and illustrative drawings of a presently preferred embodiment of the invention in which:

FIG. 1 is a diagram of one array of devices or machinery disposed to accomplish the method of this invention; and FIG. 2 is a diagram of another array of devices or machinery disposed to accomplish the method of this invention.

DESCRIPTION OF THE PREFERRED EMBODIMENTS

Figure 1:
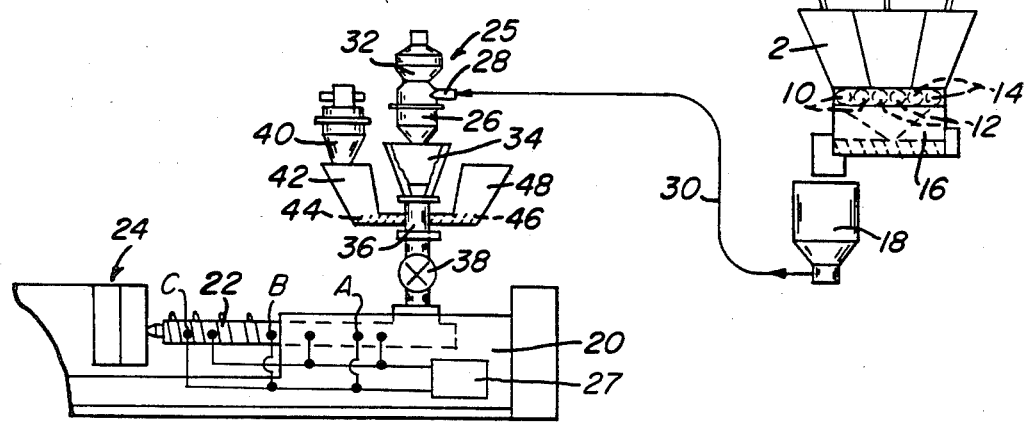

As diagrammatically illustrated in FIG. 1, one array of machinery for accomplishing the method of this invention comprises an initial hopper 2 for receiving a dry resin and one or more different dry additives depending on the number of material receiving compartments in the hopper 2. As illustrated, hopper 2 is divided into three compartments each of which has a respective material supply or feed lines 4, 6 and 8 associated therewith through which a sufficient quantity of dry material is supplied to each of the three compartments. The materials supplied to the compartments of hopper 2 are in any suitable dry form, such as pellets or granular or powdered materials, and are transported or conveyed through lines 4, 6 and 8 in any suitable manner as is known. For example, line 4 is connected to a suitable source of a suitable base resin, such as a polypropylene powder; line 6 is connected to a suitable source of powdered filler, such as talc, wollastonite or calcium carbonate and line 8 is connected to a suitable source of dry additives, such as color concentrate, titanates or other processing aids. The dry materials are discharged in controlled or metered amounts from the compartments of hopper 2 via respective rotatable augers 10, 12 and 14. Augers 10, 12 and 14 discharge a preselected quantity of each material from the hopper 2 into a blender 16 wherein the materials are initially mixed together. Inasmuch as multiple material hoppers having a metered or controlled discharge of the various materials and blenders may be of any suitable commercially available structure, a more complete description thereof is not necessary to one skilled in the art. It is, however, to be understood that blenders and multiple material hoppers have well known components such as electrical or mechanical drives which are energized through suitable controls to provide the proper sequence of operation as described herein. A description of such well known components would unnecessarily lengthen the description of this invention and would serve no useful purpose to one skilled in the art since this invention is not directed to the particular structure of the various structural devices identified herein.

The drives of augers 10 and 12 are energized in this illustrative preferred embodiment for a period of time to provide filler material which is 0 to 40 percent of the weight of the total resin/filler blend. Auger 14 is energized during the same time period augers 10 and 12 are energized to provide a selected amount of the other selected additive.

Once the proper proportion of resin filler and additive is received within the blender 16 the resin-filler additive is subsequently suitably blended within blender 16 to provide a dry fairly homogeneous mixture. If desired, the resin-filler blending in blender 16 is at a relative low speed, such as 40-300 rpm and thereafter the initially blended mixture is discharged to an auxiliary blender 18 wherein the initially blended mixture is further blended to obtain an essentially uniform or homogeneous mixture. For example, blender 18 is rotated at 100-800 rpm.

For the purposes of this invention it has been determined that the base resin must be a thermoplastic resin such as the polypropylene as indicated and the additive or filler must be a low heat conductivity filler such as the talc, wollastinite, mica or calcium carbonate as indicated. A polyethylene resin is also satisfactory for the method of this invention. Such fillers are all relatively inert materials with respect to thermoplastic resins and do not liquefy or become molten during the heating cycle described herein or during the injection molding process. Thus, for this invention low heat conductivity fillers identifies fillers which, although heated, remain as a heated solid throughout the entire material supplying and article forming process. Although such fillers are relatively inert with respect to a thermoplastic resin such fillers are frequently coated by their suppliers to promote bonding with the liquefied thermoplastic resin. Some of such fillers are porous to an extent that the heated liquid resin enters the voids within the filler such that, upon cooling, solidified resin extends through the fillers. In the method of this invention the dry base resin and the dry filler additive are in any suitable form as is commonly commercially available for molding purposes. Such resins and fillers may be in the form of pellets, irregular particles, powders, flakes and the like which forms are collectively referred to herein as a granular material. A dry color concentrate as is normally used in an injection molding process may or may not be used as desired. Further, as desired, more than one low heat conductivity filler may be supplied to the blender 16 in a desired proportion to obtain selected physical characteristics of the molded article.

An injection molding machine 20 illustrates any one of the various commercially available injection molding machines having a feed screw 22 for supplying a flowable molten mass of plastic material to a suitable mold 24. Such injection molding machines normally have a material metering and blending unit 25 secured thereto so that the material to be molded is discharged from the unit 25 into the material receiving chamber (not shown) of machine 20. Unit 25 may be of any suitable combination of devices or machinery as are used in commercial injection molding operations. Unit 25, as shown, consists of an uppermost vacuum loader 26 having its material inlet line 28 connected via a conveyor line 30 to the discharge line of blender 18 so that upon energization of the vacuum pump 32 on loader 26 material is conveyed from blender 18 to the material receiving chamber of loader 26. As is known, after the material receiving chamber of loader 26 has been filled with the resin-filler additive mixture the vacuum is discontinued and the loader 26 sequentially gravitationally discharges the material therein into a material receiving chamber of a lower hopper 34. The material within lower hopper 34 is subsequently gravitationally discharged through a lower throat section 36 to an inline blender 38. Throat section 36 is used in the material supply sequence to permit other additives to be added to the resin-filler additive mixture as discharged from lower hopper 34 as is common practice in injection molding. As shown a vacuum loader 40 and hopper 42 for dry color concentrates is suitably supported outwardly adjacent the throat section 36 to provide a suitable supply of color concentrate. The color concentrate is suitably discharged in selected amounts by means of an auger 44 at the lower portion of hopper 42 into the throat section 36. Similarly, and if desired, additional dry powdered or pelletized additives, such as processing aids, are suitably discharged in selected amounts into throat section 36 via an auger 46 at the lower portion of a hopper 48 having such processing aids therein and suitably supplied thereto. The mixture supplied to throat section 36 falls gravitationally into the inline blender 38 and is intimately mixed together therein upon proper energization of the blender 38. Upon completion of the blending in the inline blender 38 the blended dry mixture is gravitationally discharged into the material receiving chamber of machine 20. Thereafter the blended material is withdrawn from the material receiving chamber of the machine 20 and enters the feed screw 22 in the normal manner. The various devices of unit 25 and their orientation with respect to each other are well known in the art.

Feed screw 22 is an elongated screw which has a material receiving chamber at its rearward end and, upon controlled rotation, ejects a controlled volume of material from its forward end into the article forming mold 24—i.e., the material is injected from screw 22 into the mold 24. As is known, injection molding machines are provided with suitable heating means (schematically shown) to heat the material within the chamber in which the feed screw 20 rotates so that the material is at a proper temperature for article molding purposes. Such heating means are effective along separate longitudinal extents of the feed screw 20 and are of a number as selected by the machine manufacturers. As shown, three sets of input terminals A, B and C are shown longitudinally spaced along feed screw 20 which terminals are suitably connected to a suitable control 27 for controlling the heat output of heater means such as electrical heaters (not shown) connected to terminals A, B and C respectively. Such individual heater means may be of any suitable well known structure whereby the three zones of heating as hereinafter described can be achieved. In this invention the incoming dry mixture of thermoplastic resin and low heat conductivity filler is introduced into the material receiving or rear end of the feed screw 20. While in such material receiving zone heat, by means of heaters energized through terminals A, is provided to heat the mixture such that the resin is transformed into a molten or flowable state and the low heat conductivity filler is heated to essentially the same temperature as the molten resin. Since the filler has a low heat conductivity the filler is heated; however, the filler is not transformed into a molten mass due to the very high heat quantity which would be required to transform such a substance into a molten mass. To convert a low heat conductivity material into a molten state would be prohibitive from a cost standpoint. The filler is, however, heated and dependent upon its physical characteristics is coated, filled, saturated or impregnated with liquid resin. In view of the low heat conductivity of the filler, the time restraints of commercial molding cycles, and the limits of screw 20 it has been determined that a high temperature must be maintained in the material receiving zone heated through terminals A to rapidly heat the mixture to obtain proper transformation of the resin into a molten state and heating of the filler. High temperature in the zone heated through terminals A being with relation to other temperatures hereinafter described.

After the initial heating of the incoming mixture the molten resin/heated filler is maintained in a standby or ready heat condition by suppling appropriate heat energy via terminals B to the portion of the molten resin/heated filler intermediate the inlet zone (heated through terminals A) and the ejection zone (heated through terminals C). It has been determined that the standby zone temperature can be the lowest relative temperature along the length of the screw 20.

In contemplation of ejecting the molten resin/heated filler from the zone of feed screw 20 in which the material to be ejected is located prior to ejection, the molten resin/heated filler is heated to a higher temperature, via heat supplied through terminals C, then the material in the intermediate material retention or standby zone. Such heating of the molten resin/heated filler is necessary to insure that the ejected material does not fall below the proper minimum molding temperature as it enters and subsequently solidifies in the article forming mold 24. It will be noted that in the method of this invention once the resin is transformed into a molten state the resin remains molten while the filler remains as a heated solid throughout the process.

The following table sets forth in degrees Fahrenheit examples of the above described heating cycle for the indicated molded articles:

| Product | Screw Heating Zone | | |
| --- | --- | --- | --- |
| | Initial | Intermediate | Injection |
| Paint Pail | 450 | 400 | 430 |
| Shelf A | 500 | 450 | 480 |
| Shelf B | 530 | 460 | 500 |
| Bottle Carrier | 550 | 460 | 520 |

From the above table it will be noted that after initial heating the molten resin/heated filler is maintained at a temperature 50 to 90 degrees below the temperature to which the incoming mixture was heated. Such lower temperature maintains the resin/filler in a standby or hold condition prior to ejection. Prior to ejection the resin/filler is reheated 30 to 60 degrees Fahrenheit for subsequent ejection. It will be appreciated that the above temperatures were determined experimentally for a specific product on a specific injection molding machine. The specific temperatures for a specific product on a specific injection molding machine will vary from those stated above; however, the pattern of temperatures will remain constant, that is, the incoming dry mixture is heated to the highest relative temperature, the intermediate material is maintained at the lowest relative temperature and the material to be ejected is at an intermediate relative temperature. The specific temperature in the various zones will also vary, as will the length of the temperature zones, in accordance with the volume of material ejected.

The method of this invention can be used with vented or unvented feed screws. It has also been determined that the moisture and magnesium content of the filler must be maintained at a sufficiently low level to prevent excess gas from being entrained in the molten resin/heated filler material injected into mold 24. Excess gas, such as water vapor, causes unacceptable surface blemishes on a molded article. It has been determined that some fillers with less than 0.02 percent moisture by weight during the molding process are required to obtain a blemish free molded article. To obtain less than such 0.02 percent moisture the moisture content of the injected material is maintained at about 0.01 percent moisture by weight so that the moisture absorbed by the injected material does not rise above 0.02 percent by weight. In other fillers such as calcium carbonate a moisture content of 0.06 percent by weight can be tolerated.

The above described method wherein the compounding is achieved within the feed screw 22 has numerous advantages. Obviously any pre-compounded dry material must be heated in the feed screw 22 to provide a moldable molten mass. By heating all the materials within the feed screw 22 the materials need only be heated once and no pre-compounding heating is necessary. Inasmuch as metering and blending units are normally used with molding machine 20 the only additional machine cost is the cost of the hopper 2 and blenders 16 and 18. Pre-compounding requires the substantial cost of extruders, coolers, pelletizers, etc. as previously described. By in the machine compounding of this invention the molder can compound only as much material as desired for a molding operation.

As is well known the various requirements for a finished molded plastic article, such as finish, strength, uniformity of color, flexibility, etc. determine the commercial acceptability of specific molded plastic parts. The in machine compounding process of this invention does not necessarily provide commercially acceptable molded plastic articles in all instances; however, it does provide commercially acceptable molded plastic articles in many instances. In particular better results as to commercial acceptability were obtained under the following conditions:

A powdered filler provided better acceptability when used with a powdered plastic resin such as polyethylene propylene.

Of four powdered fillers tested calcium carbonate provided better acceptability with respect to surface appearance than talc, wollastonite or mica. Wollastonite provided better strength characteristics with respect to rigidity than talc, calcium carbonate or mica.

Pelletized color concentrate provided better surface appearance than dry powdered color concentrate.

A calcium carbonate filler provided a better surface appearance than other dry fillers; however, the molded article had a substantially lower flexibility.

Processing aids as are available from material suppliers provided an improved surface as compared to articles molded without processing aids.

Thus, with in machine compounding the material mixture to be supplied to the feed screw must be selected with respect to the physical properties and appearance desired in the molded article.

Figure 2:
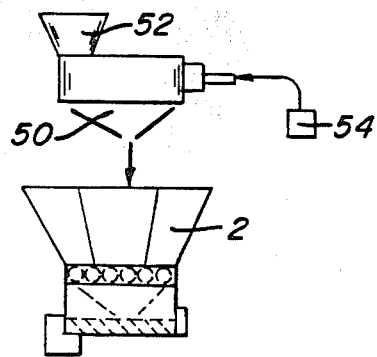

FIG. 2 illustrates a practical alternative method of supplying a material mixture to a metering and blending unit 25. In this embodiment a high speed blender 50 is provided prior to the hopper 2 to premix a liquid additive with a powdered filler which liquid/powder mixture is then discharged into one of the compartments of hopper 2. As shown, high speed blender 50 receives a selected quantity of powdered filler from a suitable source 50 and a selected quantity of liquid additive from a suitable source 54 which liquid and powder are thoroughly mixed before being discharged into hopper 2.

Although specific preferred embodiments of this invention have been described, it is to be realized that there are a large number of preferred embodiments. The particular components selected for compounding as described hereinabove will vary dependent upon various factors such as the materials to be compounded, the amount of material required to properly supply a specific injection molding machine, the space available to locate the various components needed, etc. The publications of Conair, Inc. of Franklin, Pa. well illustrate the availability of various loaders, blenders, loader/blenders, feeders and loading and conveying systems which may be selected, in whole or in part, to provide components to accomplish the method of this invention. The following publications of Conair, Inc. are incorporated herein to illustrate the variety of components available:

Engineering Data No. 110
Engineering Data No. 931
Engineering Data No. 102
Engineering Data No. 110
Engineering Data No. 126
Engineering Data No. 950
Engineering Data No. 951
Engineering Data No. 952
Engineering Data No. 107
Engineering Data No. 9312
Bulletin No. 947
Form No. 230 CL 4/82
Form No. 128 CL 9/82

In addition other manufacturers provide a wide variety of well known similar components. Thus, depending on the requirements of a specific installation a wide variety of components may be selected to provide preferred embodiments of this invention. Accordingly, a description of all reasonable preferred embodiments of components to accomplish the method of this invention would unreasonably extend this description.

One particular selection of available components that has performed satisfactorily is the combination of a vertical mixer having a virgin resin container or bin and a filler container or bin mounted on the upper surface of the mixer in spaced relationship. Suitable controls were provided whereby controlled amounts of virgin resin and filler were sequentially supplied to the mixer.

Having described preferred embodiments of this invention in accordance with the Patent Statutes and having set forth various modifications thereto, those skilled in the art will be cognizant of the fact that still other modifications can be made without departing from the spirit and scope of this invention. Accordingly, the following claims are to be construed as including modifications of the structures defined therein as would be known to those skilled in the relevant art.

We claim:

1. The method of supplying a moldable mixture of material to an article forming mold of an injection molding machine which machine has an elongated material feed screw selectively rotatable within an elongated chamber and which chamber has longitudinally contiguous inlet, intermediate and discharge zones and which machine has controllable heating means for independently heating material within such zones, respectively, the improvement comprising:

mechanically mixing a granular thermoplastic resin with a granular filler to form a granular mixture,
supplying said mixture to such an inlet zone,
conveying said mixture sequentailly through such inlet, intermediate and discharge zones,
heating said mixture within such a chamber by supplying heat to such inlet, intermediate and discharge zones to initially convert the resin contained in said mixture as supplied into a molten state and maintain said converted resin in a molten state throughout said chamber and to simultaneouslky heat the filler contained in said mixture with said filler remaining as a heated solid throughout said chamber, said heating of said zones being of a magnitude that the temperature of the molten resin and said heated solid filler in such intermediate zone is lower than the temperature of said molten resin and said heated solid filler in such inlet and discharge zones, and discharging said molten resin and said heated solid filler from said discharge zone to such an article forming mold.

2. The method as set forth in claim 1 wherein said molten resin and said heated solid filler are mixed within such a chamber during said conveying.

3. The method as set forth in claim 1 wherein said mixing within such a chamber is obtained by the rotation of a feed screw in such a chamber.

4. The method as set forth in claim 1 wherein said heating is of a controlled amount of heat supplied to each of said zones.

5. The method as set forth in claim 1 wherein the heating of the inlet zone of such a chamber raises the temperature of said mixture to the highest temperature within said chamber.

6. The method as set forth in claim 4 wherein the heating of said molten resin and said heated solid filler prior to said discharge is as a temperature intermediate the temperature of said mixture in the inlet and intermediate zones.

7. The method as set forth in claim 1 wherein the heating of the mixture in the inlet zone is between 450 and 550 degrees Fahrenheit.

8. The method as set forth in claim 6 wherein the heating of the mixture in the intermediate portion is between 400 and 460 degrees Fahrenheit.

9. The method as set forth in claim 1 wherein the heating of the molten resin and heated solid filler prior to said discharge is between 460 and 520 degrees Fahrenheit.

* * * * *